Aug. 13, 1957     A. A. KAUFMAN     2,802,530
METHOD OF AND APPARATUS FOR MAKING A SPRINKLER HOSE
Original Filed Oct. 23, 1952     2 Sheets-Sheet 1
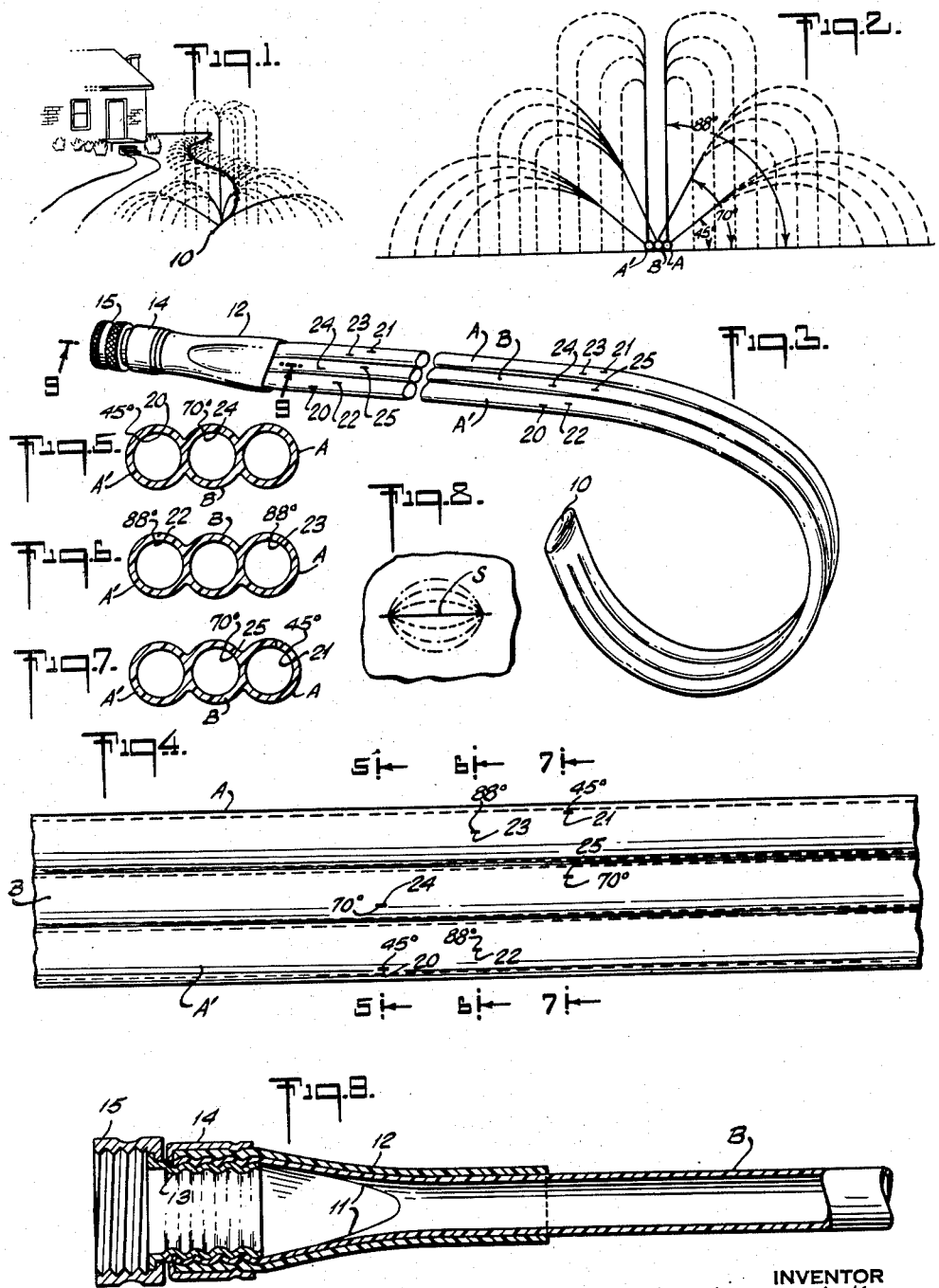
INVENTOR
ALBERT A. KAUFMAN
BY
ATTORNEY

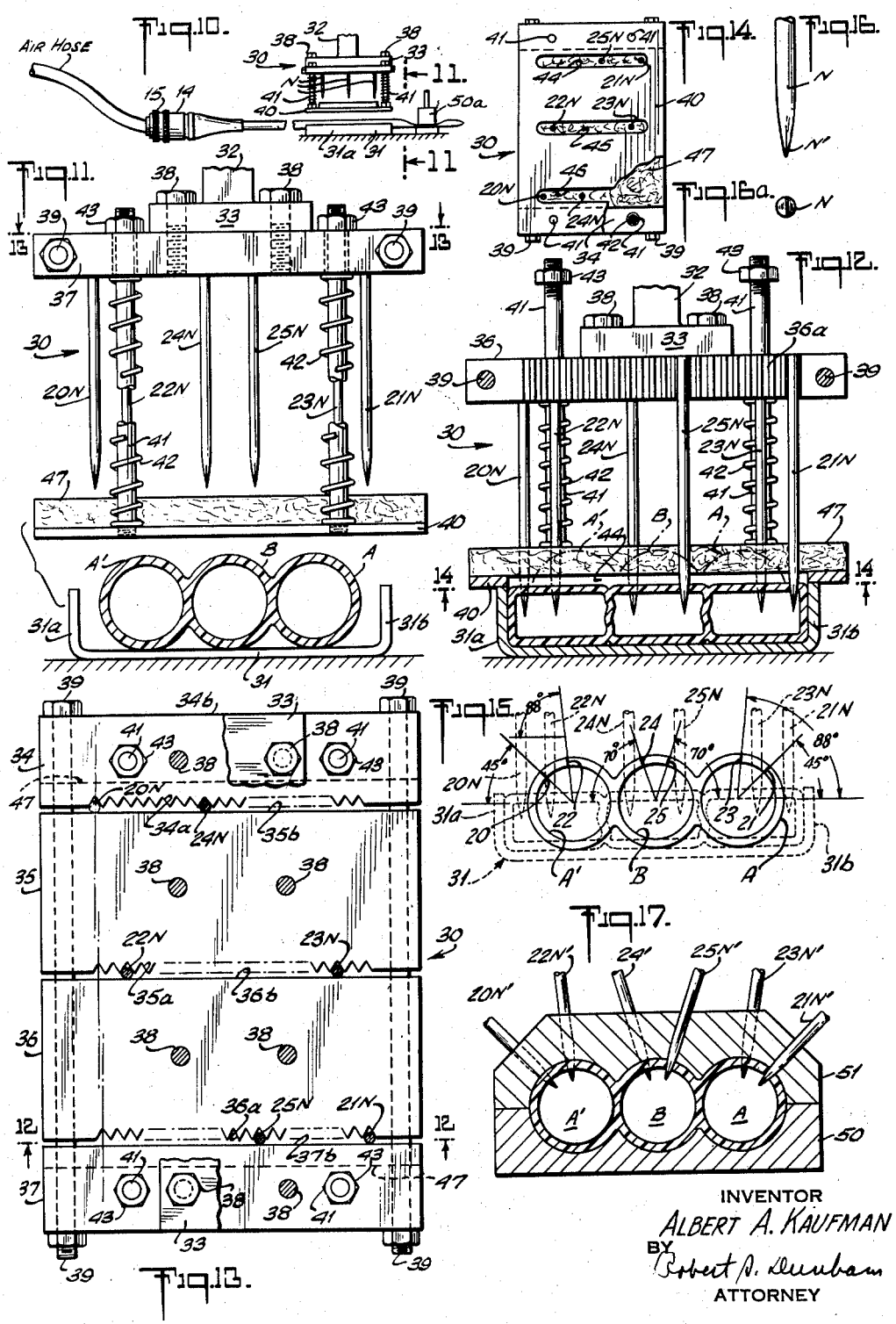

United States Patent Office 2,802,530
Patented Aug. 13, 1957

2,802,530

METHOD OF AND APPARATUS FOR MAKING A SPRINKLER HOSE

Albert A. Kaufman, North Plainfield, N. J., assignor, by mesne assignments, to Amerace Corporation, New York, N. Y., a corporation of Delaware Original application October 23, 1952, Serial No. 316,450. Divided and this application May 8, 1956, Serial No. 583,587

9 Claims. (Cl. 164—108)

The present invention relates to a light weight multi-tubular hose and more particularly to a method of and apparatus for puncturing such a hose to convert it into a sprinkler hose for use in the sprinkling of gardens and lawns.

As such, the present invention is a division of my prior and copending application, Ser. No. 316,450, filed October 23, 1952, now abandoned. My prior or parent application aforesaid is directed to a hose per se, whether or not it be used as a sprinkler hose, i. e. whether or not it be perforated. The present invention is restricted to the making of such a sprinkler hose, particularly by perforating a hose for that purpose, and relates particularly to a method of making a group of perforations in a predetermined arrangement or disposition and also to apparatus for use for this purpose.

Hose for conducting fluids has heretofore been typically in the form of a single tube with sufficient wall thickness to withstand the bursting stresses, or reinforced for this purpose. It is bulky, difficult to wind and when sharply kinked will completely shut off flow. It has also been proposed to make a hose in a multi-tubular form, particularly for use as a sprinkler, but only by laterally joining together complete single tube sections, so that the amount of material used is at least a direct multiple of the amount used in each single tube.

According to the present invention, the hose, whether to be used simply for conducting fluids or for use as a sprinkler hose, is made in the form of a multiple tube, seamless extrusion with all the tubes side by side. The total cross-sectional area of the fluid-conducting spaces of the multiple tubes provided is made equal to the cross-sectional area of the usual standard size or prototype tube so as to have equal fluid-conveying capacity. As, however, the load on the tube walls is much less, the wall thickness is substantially reduced from what the usual single tube hose employs. The typical one-inch hose of 1⅜" to 1½" O. D. may be replaced by a four tube hose about ⅝" x 2¼" outside dimensions, while the typical ⅝ inch hose ⅞" O. D. may be replaced by a three-tube hose about 7/16" x 1¼" outside dimensions. In each case the multi-tube hose may be of less weight per unit length with equal bursting strength. It can be wound much flatter or ribbonwise on a reel, and kinking or twisting of such hose does not completely cut off flow.

The automatic sprinkling of gardens and lawns has heretofore usually involved the use of hose or piping to conduct the water from the fixed plumbing to some form of rotary or oscillatory mechanical sprinkler connected to the end of the hose, or the piping, and capable of producing some form of spray to cover an area centered generally about the point where the sprinkler is attached to the hose, or pipe. Such devices are able to cover only a limited area and require long enough hose to reach the center of this area. In general, they are unable to deliver water with a high degree of uniformity of coverage over the various areas which can be reached by the spray and often waste much of the spray in unwanted areas. These devices are likely to get out of order and involve considerable expense in addition to the cost of the hose itself.

Furthermore, the sprinklers in common use are not suited for curving around circular areas or for use on hills, rock gardens, terraces, between the rows in vegetable gardens or along narrow strips and borders because they do not place the water over areas where the water is desired.

The present invention contemplates a combined sprinkler and hose wherein the entire length of the hose itself is available as a sprinkler to provide a spray which soaks the ground on both sides of the hose for the entire length of the hose.

According to the present invention, the new sprinkler hose is made of lastomeric materials such as those in common use, extruded to form a plurality of tubes (usually three) side by side. The extrusion is about three times as wide as it is high and the hose will lay flat on the ground. The normally upper surface of the multi-tube hose may be punctured according to a predetermined pattern, lengthwise and crosswise so that a great many small jets are produced at predetermined angles relative to the ground and all along the entire length of the hose. There is thus formed a series of jets, some of which are nearly vertical so that water falls close to the hose; others are at a relatively low angle so that spray covers relatively remote areas and still others are at intermediate angles to provide spray which falls in between the spray produced by the other two sets of jets. This arrangement of jets makes it possible to obtain from the hose a sprinkling pattern according to which the water falls on a strip of ground each side of the hose for the entire length of the hose.

In the manufacture of the hose, the elastomeric material of the desired cross-section is first extruded and the extrusion is cut into suitable lengths, say 50 feet or 25 feet. Preferably one end of the extrusion is secured to a hose coupling so that the hose can be coupled to the usual hose connections or piping. The other end is heat sealed to close off all the tubes, or may be connected to a male coupling for securement to another hose, or to a cap.

For suitably puncturing the walls of the multiple tube extrusion, the coupling end of the hose may be connected to a source of air pressure which distends the extrusion so that the two walls are stretched and the tubes become circular. This places the material of the extrusion in definitely oriented positions corresponding with what it will be when the hose is subjected to water pressure.

Owing to the soft nature of the elastomeric material used, it is impractical to attempt to place holes in the tube walls by operations such as drilling which could be used with tubes made of rigid material such as metal.

According to the present invention, however, the elastomeric material when under internal air pressure is confined at suitable spots or areas along the length of the hose and punctures are made in the confined, preferably flattened, walls of the tubes. In the latter case, these punctures are displaced from the center lines of the respective tubes in preselected amounts so that when the external pressure is removed the punctures migrate to proper angular position so that the jets have desired angles of elevation.

Other and further objects appear as the description proceeds.

The accompanying drawings show, for purposes of illustrating the present invention one form of hose, together with the method and apparatus for manufacturing the same, it being understood that the drawings are illustrative of the invention rather than limiting the same.

In the accompanying drawings:

Figure 1 is a perspective view illustrating a curved lawn area being sprinkled with the present hose;

Figure 2 is a diagrammatic view illustrating the hose and the trajectory of the various jets produced by the hose;

Figure 3 is a perspective view showing a length of hose and indicating where the hose walls are punctured;

Figure 4 is a top plan view of a portion of the hose showing a group of punctures;

Figures 5, 6, and 7 are transverse sectional views of the lines 5—5, 6—6 and 7—7, respectively, of Figure 4;

Figure 8 is a fragmentary view illustrating the slit formed by the puncture needle and the deformation of the slit when water under pressure escapes through the slit;

Figure 9 is a sectional view in the line 9—9 of Figure 3, illustrating the joining of the multi-tube hose to the hose coupling;

Figure 10 is a diagrammatic view illustrating the method of puncturing the tube walls;

Figure 11 is an enlarged sectional view on the line 11—11 of Figure 10, showing the flattening and puncturing apparatus separated and the tubes distended by internal pressure;

Figure 12 is a view similar to Figure 11, showing the apparatus in closed position with the tubes flattened and the needles in puncturing position;

Figure 13 is a top plan view with parts in section along the line 13—13 of Figure 11;

Figure 14 is a section taken on the line 14—14 of Figure 12 looking in the direction of the arrows;

Figure 15 is a diagrammatic view illustrating the recovery of the hose flattened as in Figure 12 to the original distended shape of Figure 11, and illustrating the location of the punctures;

Figures 16 and 16a are side and end views of the puncturing needle; and

Figure 17 illustrates a modified form of method of and apparatus for puncturing.

The hose of the present invention utilizes a multi-tube extrusion preferably made of suitable elastomeric material such as polyvinyl chloride, polyethylene, or natural or synthetic rubber. This material is extruded from the usual plastic extrusion machines in indefinite lengths. A typical single tube garden hose has an inside diameter of ⅝ of an inch and is able to carry all the water which can be delivered through the usual house piping. Such a hose, owing to the stress given the material by the usual hydrostatic pressure to which it is exposed, has to have relatively heavy side walls in order to resist rupture. Where, however, a hose is made of equivalent total cross-section, but in the form of a plurality of tubes, the tube walls may be very much thinner. For example, the cross-section of a three-tube hose with each of the three tubes having an inside diameter of approximately .360 inch is equivalent to the ⅝ inch hose. The wall thickness of the three-tube hose having .360 inch inside diameter is on the order of .03 inch thick, which gives by calculation a cross-sectional area for a three-tube hose of approximately .110 square inch neglecting the reduction in such area incident to a wall thickness in the webs between adjacent fluid passages of less than twice the outer wall thickness. The wall thickness of a single tube hose of equal carrying capacity and having ⅝ inch inside diameter and ⅞ inch outside diameter must be approximately .125 inch thick in order to withstand the increased stresses in the hose due to the larger diameter. The cross-sectional area of such a single tube hose is (by calculation) .294 square inch, which is more than twice that of a three-tube hose as aforesaid. Since weight per unit length of hose is directly proportional to the cross-sectional area, the conventional single tube hose will weigh per unit length more than twice that of a three-tube hose having equal carrying capacity and so will be more difficult to handle than a three-tube hose.

The weight of the multi-tubular hose can be made even less by making the tubes integral along their sides so that the adjoining sides have a common portion of the same thickness as the thickness of one of the individual tubes, as shown in Figs. 5, 6 and 7.

Such a multi-tubular hose as has just been described is illustrated in the drawings which show three such tubes side by side. Such a hose is approximately 1¼ inches wide and ⁷⁄₁₆ inch high so that it lays flat on the ground without any tendency to twist when pressure is applied.

In the drawings, the two outside tubes are indicated at A and A' and the center tube is indicated at B. The far end of the length of hose is provided with a coupling or heat sealed, as indicated at 10, so that all three tubes are closed. At the other end of the extrusion, the intermediate connecting walls between the tubes are slitted as indicated at 11 (Fig. 9) to form a short tube, and this slitted end together with a reinforcing tube 12 of similar material is forced about a coupling sleeve 13. The elastomeric material of the tubes A—B—A' and the reinforcing tube 12 is secured in place by an outer ferrule member 14 crimped in place. The coupling sleeve 13 receives the loose threaded bushing or nut 15 by which the hose may be coupled to another hose or to a pipe or faucet or the like. At spaced intervals along the multi-tubular hose, the surfaces which are to be uppermost in use are punctured to provide openings through which water may be forced to form sprinkling jets. These punctures are located in a pattern which achieves uniform distribution of water not only lengthwise of the hose but across the hose so that a restricted area each side of the hose and for the full length of the hose is sprinkled.

The preferred pattern of openings or punctures is shown in Figures 4-7. Here, the left tube A' and the right tube A are provided with punctures indicated at 20 and 21, disposed at such a position as to cause the issuing jet to be at angles of approximately 45° above the ground and at opposite sides of the median vertical plane. The tubes A and A' are also provided with punctures 22 and 23, disposed at such a position as to cause the issuing jets to be at angles of approximately 88° above the ground and at opposite sides of the median vertical plane. The central tube B is provided with punctures 24 and 25, disposed at such a position as to cause the issuing jets to be at angles of approximately 70° above the ground and at opposite sides of the median vertical plane.

In order to avoid interference of the jets with one another, the six punctures in each group as indicated in Figures 3 and 4 are placed in pairs along the hose. The pattern used for the punctures may be varied considerably.

When the hose is subjected to internal water pressure, water tends to escape through all the punctures, and if the maximum area of the punctured openings through which water can escape is properly related to the maximum capacity of the tubes to carry water, it is possible to maintain pressure all along the hose and maintain uniform flow rate through all the hose openings. To effect this, the total cross-sectional area of the slits when wide open should not exceed the cross-sectional area of the tube. Where the supply line is larger than ⅝ inch, additional lengths of hose may be connected end to end.

The slit formed by the cutting needle is indicated by the relatively long heavy line S in Figure 8. In practice, this slit is one which can be produced by a needle shaped as shown in Figures 16 and 16a and having a diameter of .050 inch. The slit is therefore approximately .050 inch long. Until the water pressure is applied, the slit walls are tight against one another; but when the water pressure is applied, the water tends to escape through the slit and stretch the opening so that it becomes wider and wider as indicated by the arcs above and below the line S in Figure 8. At high pressure, the openings become almost circular. As the slits have very smooth walls, a smooth, well-formed jet is directed at an angle corresponding to the angle of the puncture as above described.

As a result, all the holes or punctures in the hose become effective producers of jets of water at predetermined angles and spaced along the hose in accordance with the spacings of the groups of openings. A convenient spacing for a fifty-foot hose is about 15 inches.

The lowermost jets are emitted as above stated at angles of about 45° and these break up due to air resistance and eddying air currents, and fall on the ground at uniform distances from the hose. The steeper jets at an angle of about 70° from the ground go up somewhat higher into the air and fall closer to the hose, while those that go up nearly vertically, for example at 88°, fall on the ground still nearer the hose. The overall result of the use of the hose is to provide a remarkably uniform coverage of ground on each side of the hose. It has been found that with water pressures of 25 pounds per square inch and up, one can readily cover an area at least ten feet each side of the hose and when a fifty foot hose is used, it thus becomes possible to cover 1000 square feet of ground. At 25 pounds pressures, the "output" on this area is equal to about .5 of an inch of rainfall per hour. The hose requires no attention once it is laid out and can readily be moved to another location or reeled flat.

After the length of multi-tube ertrusion has been heat sealed at 10 and provided with the coupling 14, 15, it is connected, as shown in Figure 10 to an air hose and air at a pressure sufficient to distend the hose is released. The distended or stretched hose is passed through puncturing apparatus generally designated at 30 in Figures 10 to 15. The first set of punctures is placed near the closed end of the hose. The puncturing apparatus is then opened, the hose advanced for the next set of openings and clamped so that the air pressure is not lost by reason of the holes previously made.

The puncturing apparatus has a stationary trough 31 the sides 31a and 31b of which are farther apart than the sides of the tubes A, B, A', as shown in Figure 11. The trough is shallower than the full height of the three tubes. Above the trough is a reciprocable plunger 32 having a downwardly facing flange 33 at the lower end. Four plates 34, 35, 36, and 37 are secured to the plunger flange by bolts 38. The three plates 34, 35, and 36 have notched or sawtoothed edges 34a, 35a and 36a opposite the smooth edges 35b, 36b and 37b of plates 35, 36 and 37. The four plates are drilled to receive clamping bolts 39.

The teeth 34a, 35a and 36a provide a series of saw-teeth adapted to receive puncturing needles N. The teeth in 36a and 34a are displaced to the right and to the left, respectively, of those in 35a, preferably one-third of the spacing of the teeth from one another. For example, a pitch of .054 inch between teeth makes it possible to place needles .018 inch apart, measured crosswise of the apparatus. With different pitch and number of toothed or notched plates, various needle spacings may be obtained. When the needles are placed in position and the plates clamped together and secured to the head, the needles are definitely positioned to be in a predetermined pattern.

A lower plate 40 carries spacer bolts 41 which extend up through pressure springs 42 and the plates 34 and 37 and carry nuts 43. This lower or pressure plate is spring pressed downwardly. When the plunger 32 is up, the pressure plate 40 is spaced above the hose as indicated in Figure 11.

When the plunger 32 is brought down, the plate 40 is stopped by the trough, as indicated in Figure 12. By this action the three distended tubes A, B and A' have been flattened as shown in this figure. The top walls are now flat and are held against the lower face of plate 40 by air pressure. Further movement of the plunger 32 will compress the spring 42 and force the needles N down. They pass through openings 44, 45 and 46 (elongated to facilitate needle adjustment) and puncture the tube walls as shown in Figure 12.

The needles are made of round drill rod, ground as indicated in Figures 16 and 16a to have a sharp diametrical cutting edge N' so as to cut a slit rather than punch away or merely distend the material. The needles are preferably mounted so that the slits are lengthwise of the hose, so as to be along the grain. The needles preferably pass through a pad 47 carried by plate 40 and kept saturated with a suitable solvent, for example, cyclohexanone or methyl-ethyl-ketone for polyvinyl chloride. This coats the needles and causes them to make a small deposit of such liquid on the walls of the puncture or opening. This results in a fusion of the material of the slit walls, and reinforces them by forming a skin and increases the tear resistance.

The puncturing apparatus shown is arranged to puncture the slits 20-25, inclusive, in the pattern shown in Figure 4. Reference characters 20N to 25N, inclusive, are applied to Figures 11-15 for the corresponding needles. The distances separating the needles are selected so that when the external pressure is relaxed and the hose resumes its normal shape, Figures 11 and 15, the punctures made by the needle migrate from the full line position of Figure 12 (or the dotted line position of Figure 15) to the dotted line position of Figure 12 (or the full line position of Figure 15). The slits 20 and 21 have been elevated to the 45° region, the slits 22 and 23 have been elevated to the 88° region, and the slits 24 and 25 to the 70° region.

After a puncturing operation above described takes place, the clamp 50a is released, the hose advanced, clamped, and the next set of slits punched. In practice, the spacing of the group of openings in a fifty-foot hose may be about 15 inches. The drawings show a single head machine for puncturing one group of openings at a time. A plurality of heads may be used. The punches and clamps may be operated magnetically or by compressed air.

In the apparatus shown in Figure 17, the multitube hose is subjected to air pressure as before, but instead of being confined in place and also deformed as above described, it is received between two blocks 50, 51 of such size as to confine the expanded hose. The upper block 51 is provided with reciprocatory needles (20N' to 25N') corresponding with the needles above described, but instead of having all the needles operate in a vertical direction, the needles operate in directions corresponding with the angular positions of the desired punctures. The needles can all be operated by air cylinders or solenoids, one for each needle.

If one wishes to make a hose which sprinkles to one side only, the same process and apparatus may be used, except for the omission of one-half of the needles, or all the needles may be located to make all the punctures to the right or to the left of the center lines of the respective tubes. Such a hose should have a coupling at each end so that it may be connected to sprinkle to the right or to the left. One can also clamp off one of the outer tubes A or A' and then nearly all the water will be directed to one side.

The three-tube hose is the preferable form for sprinkling purposes, but it will be understood that the multitube hose may have merely two tubes or may have four or more tubes. The three-tube hose, however, has been found most satisfactory, as the three-tube structure is wider than the two-tube structure, and the four-tube structure is not necessary for sprinkling purposes. The four-tube structure is, however, more suitable for transmitting large volumes of water, as for example, in the one-inch equivalent multi-tube hose. While the sprinkler hose is designed principally to be laid on the ground in the sprinkling of laws and gardens, it is obvious that it can be supported on an elevated structure to form an overhead sprinkler, or could be used upside down or mounted on the wall for the washing of cars.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:

1. The method of manufacturing a sprinkler hose from a length of elastomeric material in the form of a plurality of tubes joined together side-by-side, which comprises closing one end of the tubes, applying fluid pressure to the other end to distend the tubes into substantially circular section, confining a limited length of the tubes; and while the tubes are thus distended and confined, puncturing the walls of the tubes, which face in one direction, substantially at right angles to the tube walls, and in a predetermined transverse pattern.

2. The method of manufacturing a sprinkler hose in accordance with claim 1, in which the punctures are made in groups, in which a first group of punctures is made at a predetermined area along the hose and each subsequent group of punctures is made at an area along the hose between the end thereof to which fluid pressure is being supplied for distending the hose and the nearest puncture of any previous group, the hose being clamped between said nearest puncture and the area of a new group of punctures prior to the making of each such new group of punctures, so as to shut off the escape of fluid through the punctures previously made before a next group of punctures is made, and provide for the distention by internal fluid pressure of each area to be punctured prior to the puncturing thereof.

3. The method of manufacturing a sprinkler hose in accordance with claim 1, in which the puncturing is done by needles precoated with a liquid having a composition selected in accordance with the composition of said elastomeric material, so as to treat the walls of the punctures with such liquid during the puncturing operation.

4. The method of manufacturing a sprinkler hose in accordance with claim 1, in which the puncturing is done by needles precoated with a liquid, which is selected from the group consisting of cyclohexanone and methyl-ethyl-ketone when the elastomeric material is polyvinyl chloride, so as to treat the walls of the punctures incidental to the puncturing operation.

5. The method of manufacturing a sprinkler hose from a length of elastomeric material in the form of a plurality of tubes formed together side-by-side, closed at one end and open at the other end, which comprises the steps of applying fluid pressure at the open end to distend the tubes so that each has a substantially circular cross section, applying external mechanical pressure to a limited length of the tubes to flatten the walls at the upper surface thereof without collapsing the tubes, puncturing the flattened upper walls of the tubes to form sprinkler openings in the form of slits disposed in a predetermined arrangement along the respective tubes by simultaneously moving a plurality of puncturing needles in a single direction which is at substantially right angles to the flattened upper walls of said tubes, and relieving the tubes from the external mechanical pressure, so as to permit them to resume a normal cross sectional shape with the punctures disposed at predetermined angular positions dependent upon the disposition of the punctures as made as aforesaid.

6. Apparatus for puncturing a multi-tubular hose to provide spray openings therein, comprising means for confining a portion of said hose of predetermined length, means for supplying fluid pressure to said portion of said hose to distend it into close contact with said confining means, an da plurality of needles arranged to be moved in respectively axial directions through said confining means for puncturing said portion of said hose with holes arranged in a predetermined pattern, said directions being substantially at right angles to the respective parts of said portion of said hose to be punctured when it is confined and distended as aforesaid.

7. Apparatus for puncturing a multi-tubular hose to provide spray openings therein, comprising means to supply a fluid under pressure to one end of a multi-tubular hose to be punctured, means providing confining boundaries for the bottom and sides of a predetermined portion of such multi-tubular hose, means for mechanically forcing said portion of said hose to conform to said boundary-providing means and for forcing the upper portions of said hose substantially to a flat shape in a single plane, while leaving said portion hollow and distended against its confining means by internal fluid pressure, a press head movable toward and away from said plane, a plurality of puncturing needles carried in a predetermined spaced arrangement by said press head and arranged with their axes substantially parallel with the path of movement of said head for substantially simultaneously puncturing a plurality of holes in said hose upon a movement of said head sufficient to cause said needles to pass through one wall only of said hose.

8. Apparatus for puncturing a multi-tubular hose in accordance with claim 7, in which a pressure plate is carried by said press head and is resiliently urged away from said head, said pressure plate constituting said means for mechanically forcing said portion of said hose to conform to said boundary-providing means.

9. Apparatus for puncturing a multi-tubular hose in accordance with claim 8, in which said pressure plate carries absorbent material adapted to be saturated with a treating liquid for precoating said puncturing needles prior to each puncturing operation, said needles passing through said absorbent material incident to the puncturing operation.

References Cited in the file of this patent

UNITED STATES PATENTS

| 484,112 | Rice | Oct. 11, 1892 |
| 2,632,511 | Hamilton | Mar. 24, 1953 |
| 2,670,795 | Griep | Mar. 2, 1954 |
| 2,753,001 | Page | July 3, 1956 |

FOREIGN PATENTS

| 481,766 | Germany | Aug. 29, 1929 |